United States Patent
Tseng

(10) Patent No.: US 7,341,395 B2
(45) Date of Patent: Mar. 11, 2008

(54) COMBINATIONAL BOLT

(76) Inventor: Ju-Chiung Tseng, P.O. Box 26-757, Taipei 106 (TW)

( * ) Notice: Subject to any disclaimer, the term of this patent is extended or adjusted under 35 U.S.C. 154(b) by 215 days.

(21) Appl. No.: 11/170,546

(22) Filed: Jun. 30, 2005

(65) Prior Publication Data

US 2007/0003363 A1 Jan. 4, 2007

(51) Int. Cl.
*F16B 13/06* (2006.01)
(52) U.S. Cl. .................. 403/296; 403/231; 403/238; 403/297; 403/403; 411/46; 411/60.1; 411/60.3
(58) Field of Classification Search ......... 403/231, 403/238, 292, 296, 403, 408.1, DIG. 10, 403/DIG. 11, DIG. 13, 297; 411/46, 48, 411/72, 57.1, 178, 60.1, 60.3
See application file for complete search history.

(56) References Cited

U.S. PATENT DOCUMENTS

| | | | | |
|---|---|---|---|---|
| 3,527,486 A | * | 9/1970 | Gamp | ................ 403/292 |
| 4,059,041 A | * | 11/1977 | Hassan | ................ 411/342 |
| 4,353,663 A | * | 10/1982 | Glickman | ................ 403/231 |
| 4,726,705 A | * | 2/1988 | Gomes | ......... 403/DIG. 11 |
| 5,586,364 A | * | 12/1996 | Ferrari et al. | ............ 411/46 |

\* cited by examiner

*Primary Examiner*—Carlos Lugo
*Assistant Examiner*—Michael P. Ferguson
(74) *Attorney, Agent, or Firm*—Rosenberg, Klein & Lee

(57) ABSTRACT

A combinational bolt which comprises a screw unit and a sleeve unit. The screw unit has a plurality of threads on a surface of a front terminal, the threads make the screw unit connect with a target object, another terminal of the screw unit forms a first concave portion. The sleeve unit, which is set inside the target object, also connects and surrounds the screw unit. A sink-proof portion is set on the surface of one terminal of the sleeve unit, the sink-proof portion makes the sleeve unit clamp onto the target object, and the outer surface of the sleeve unit has a plurality of strengthen circle units and a plurality of cut slots, and a second concave portion forms inside the sleeve unit, the first concave portion and the second concave portion clamp together.

3 Claims, 5 Drawing Sheets

COMBINATIONAL BOLT

BACKGROUND OF THE INVENTION

1. Field of the Invention

The present invention relates to a combinational bolt, and especially to a new design that can be easily assembled and connected without professional knowledge.

2. Description of Related Art

As shown in FIG. 1, the usual way to connect furniture 10 is by using nails or screws 11 or some other connection apparatuses. Most of time the furniture 10 must be assembled by a carpenter or someone with professional knowledge and tools. Therefore, the price of furniture 10 is always more expensive because of the cost of labor.

Therefore, to lower costs to the consumer, some companies provide a self-assembly function called DIY (Do-It-Yourself) which considerably reduces the costs for consumers.

But many DIY objects require the assembler to actually read the accompanying instruction manual as well as compare the parts to an accompanying picture showing how the object is assembled. This situation is inconvenient and longs for improvement.

BRIEF DESCRIPTION OF THE DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF PREFERRED EMBODIMENTS

Figure 1:
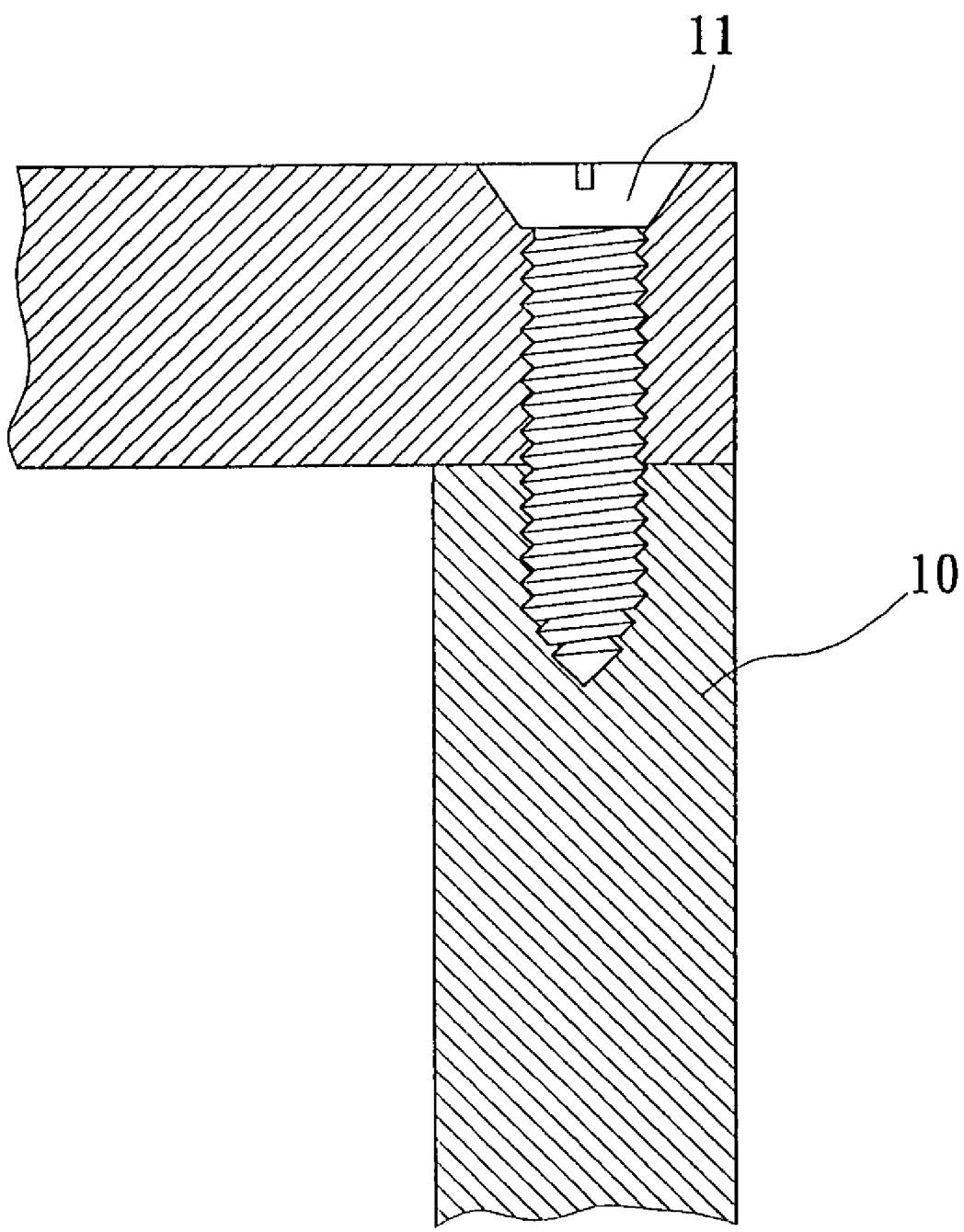
FIG. 1 shows a sectional drawing of a piece of conventional furniture.
Figure 2:
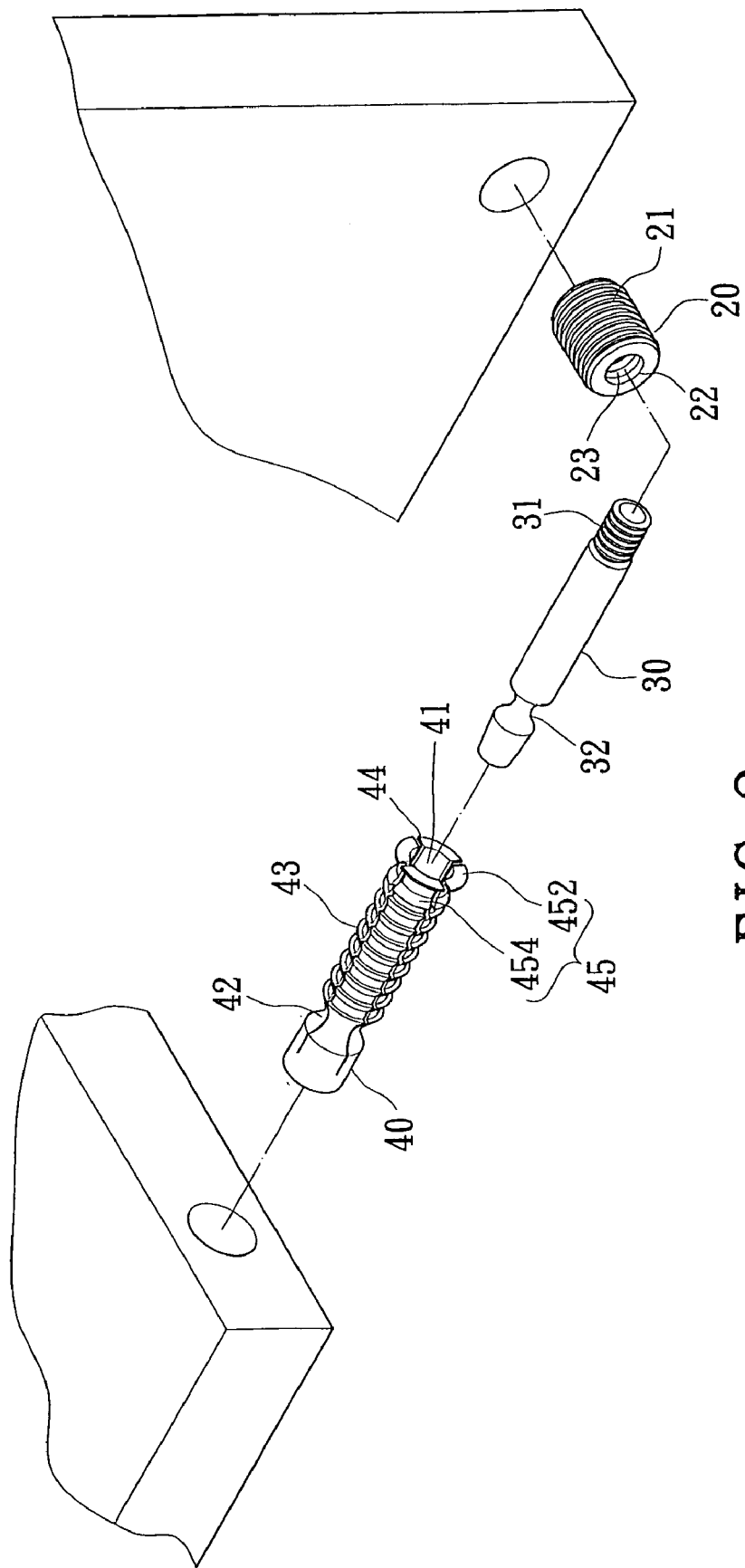
FIG. 2 shows a three-dimensional decomposition chart of the present invention.
Figure 3:
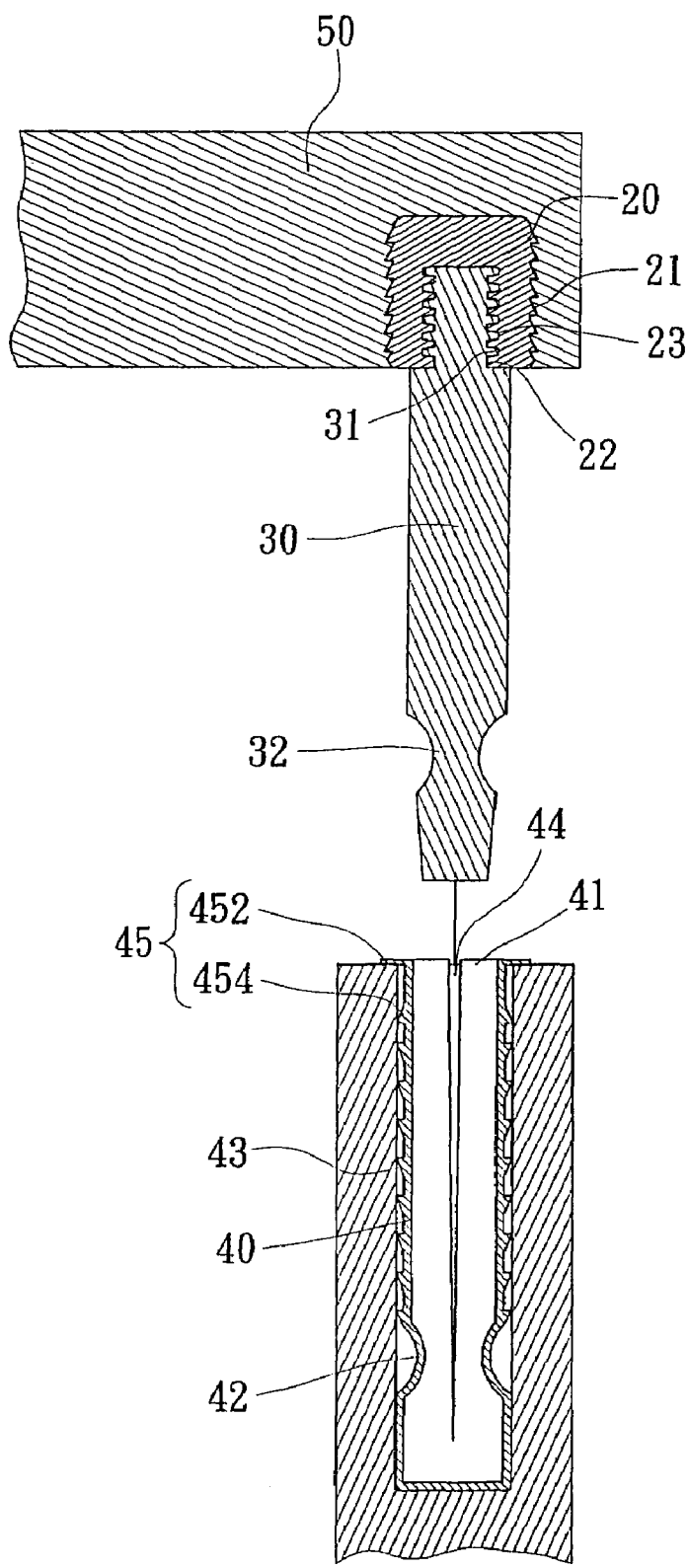
FIG. 3 shows a sectional drawing of the present invention.
Figure 4:
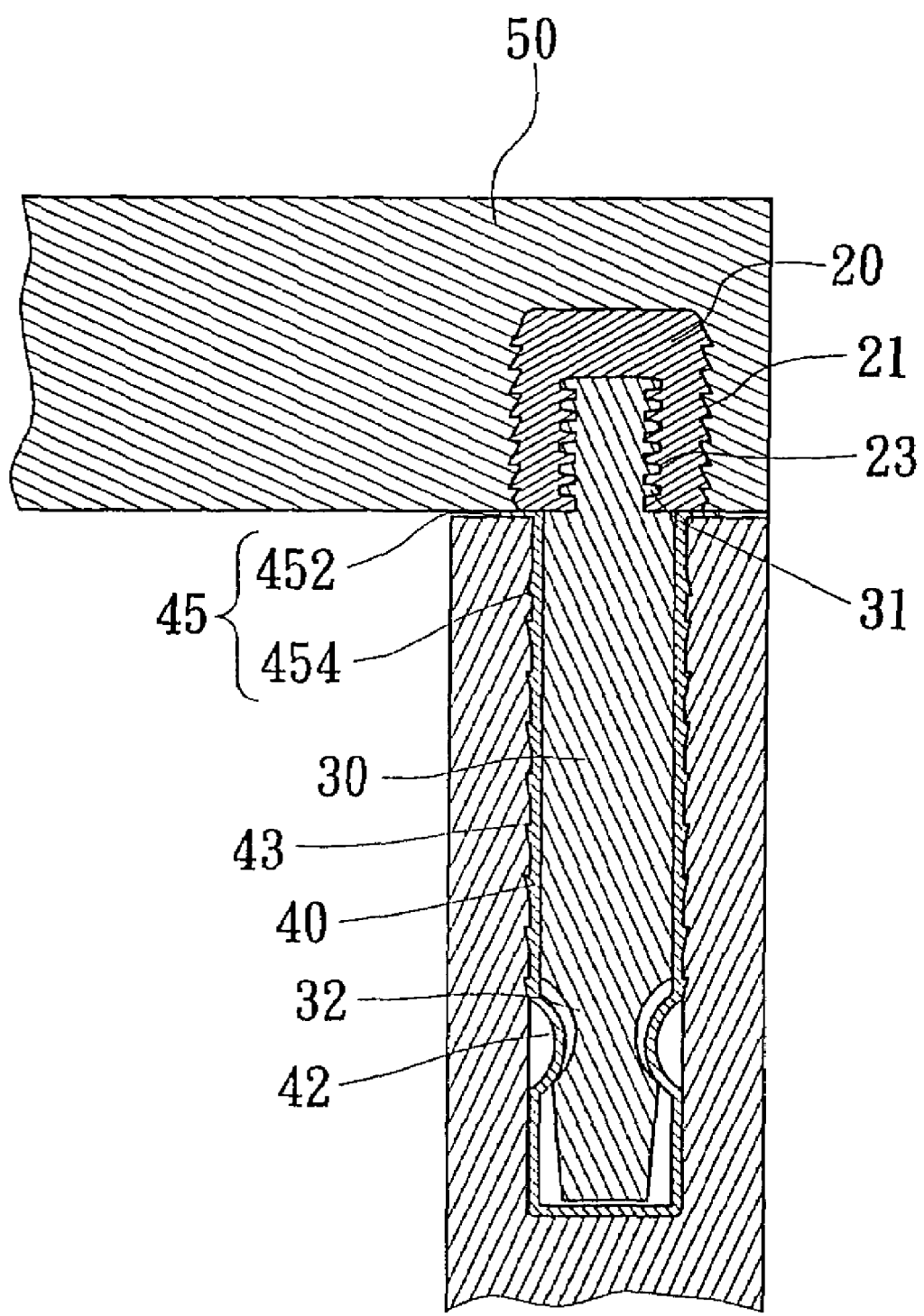
FIG. 4 shows a sectional combinational drawing of the present invention.

Referring to FIG. 2, FIG. 3 and FIG. 4, the present invention relates to a combinational bolt, which can be assembled easily without any specialized knowledge. The present invention comprises a screw fasten unit 20, a screw unit 30 and a sleeve unit 40.

The screw fasten unit 20 and the sleeve unit 40 are placed inside the furniture 50 or a target object during their construction. The screw fasten unit 20 has a plurality of outer threads 21 to clamp inside the furniture 50 or the target object.

The screw fasten unit 20 has a hole slot 22 with a plurality of inter threads 23 inside as shown in FIG. 3. The inter threads 23 match with a plurality of threads 31 on a front terminal of the screw unit 30. Therefore, the screw unit 30 and the screw fasten unit 20 can combine together and a terminal portion of the screw fasten unit 20 and the screw unit 30 also combine together.

The screw unit 30 has a cylindrical shape and its inside diameter is smaller than the sleeve unit 40. The screw unit 30 can screw into the sleeve unit 40 through a terminal open 41 to assemble the furniture 50.

A back terminal of the screw unit 30 forms a fist concave portion 32, the first concave portion 32 matches with a second concave portion 42 of the sleeve unit 40 to increase the combinational force between the screw unit 30 and the sleeve unit 40.

Figure 5:
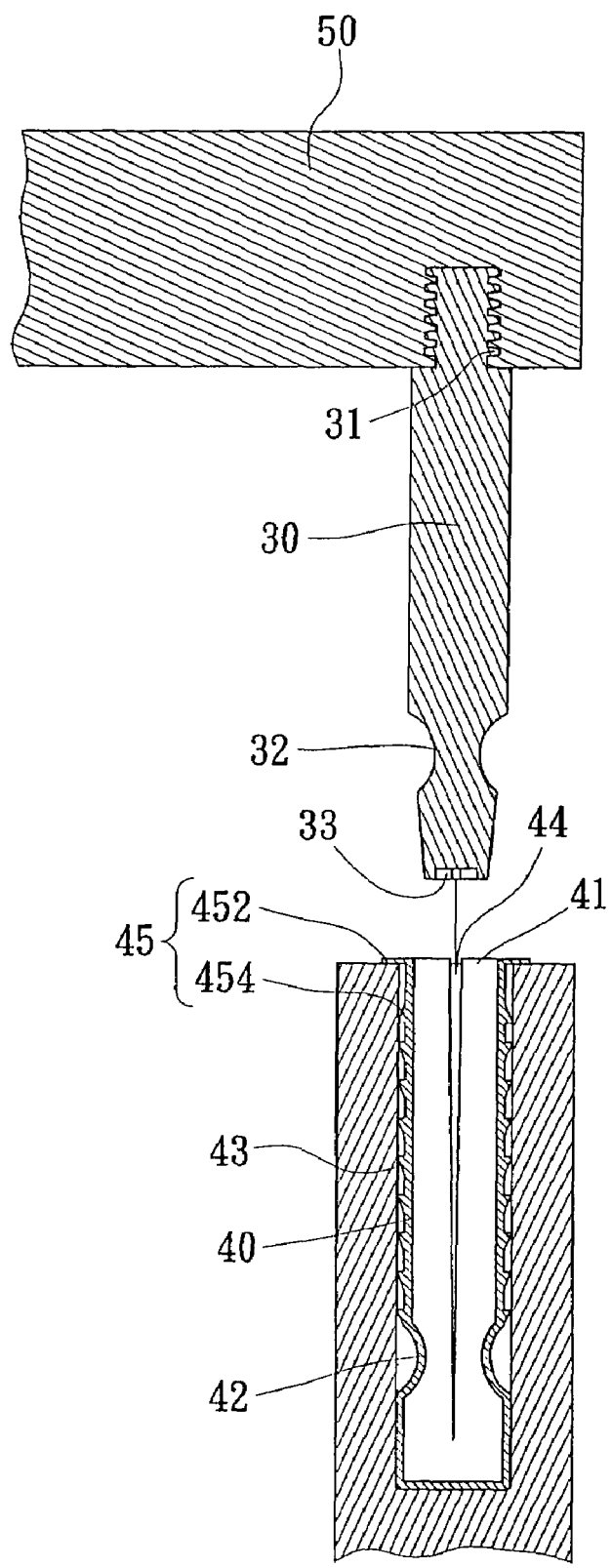
FIG. 5 shows a sectional drawing of the second embodiment of the present invention.

The back terminal of the screw unit 30 forms a concave slot 33, the concave slot can be a cross slot or a horizontal slot, and a screwdriver can be used to fasten the screw unit 30. Hence, the screw unit 30 can be screwed on the furniture 50 by the threads 31 on the front terminal and without using the screw fasten unit 20, as FIG. 5 shows.

The sleeve unit 40 has a plurality of strengthen circle units 43 and cut slots 44 on its outer surface. When the screw unit 30 screws into the sleeve unit 40, the cut slots 44 on the outer surface of the sleeve unit 40 will hold open the sleeve unit 40 and make the strengthen circle units 43 clamp tightly inside the furniture 50 or the target object.

The sleeve unit 40 has the plurality of cut slots 44 to make the internal wall of the sleeve unit 40 flexible. The screw unit 30 fits into the sleeve unit 40 easily and the first concave portion 32 of the back terminal of the screw unit 30 has a taper, as in FIG. 3 and FIG. 4. The second concave portion 42 of the sleeve unit 40 has radian measures. So the first concave portion 32 of the screw unit 30 and the second concave portion 42 of the sleeve unit 40 clamp together with each other by way of the taper and the radian measures.

The front terminal surface near the terminal open 41 of the sleeve unit 40 has a sink-proof portion 45. The sink-proof portion 45 makes the front terminal clamp the target object. The sink-proof portion 45 also has a plurality of projecting sink-proof circle units 454 and a plurality of stop units 452 near the terminal open 41 of the sleeve unit 40.

The sink-proof circle units 454 and the stop units 452 are set close together. Therefore, the sink-proof portion 45 provides an orientation function for the sleeve unit 40 and stops the sleeve unit 40 sinking into the furniture 50 too deeply.

The present invention has many advantages as follows:

The first advantage of the present invention is that it attaches onto the furniture 50 by using the screw fasten unit 20, the screw unit 30 and the sleeve unit 40.

The screw unit 30 is cylindrical and its inter diameter is smaller than that of the sleeve unit 40. Users without any professional knowledge can easily put the screw unit 30 into the sleeve unit 40.

The furniture 50 or the target object does not have to be assembled in advance, so retailers can use exhibition space more efficiently.

The present invention also lowers costs as consumers can assemble the furniture or target object by themselves.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A combinational bolt which includes:
   a screw unit that has a plurality of threads formed on an external surface of a front terminal end portion of the screw unit for coupling with a first target object, the screw unit having an annular first concave portion formed therein adjacent a rear terminal end portion thereof; and a longitudinally extended sleeve unit set inside an opening formed in a second target object, the sleeve unit having a longitudinally directed bore formed therein for receiving the screw unit therein to join the first target object to the second taget object, the sleeve unit having a sink-proof portion formed on an external surface thereof adjacent an open terminal end of the sleeve unit, the sink-proof portion of the sleeve unit clampingly engaging the second target object, the sleeve unit having a plurality of strengthening circle units formed thereon, a second concave portion forming an annular convex protrusion within the bore of the sleeve unit for clampingly engaging the first concave portion of the screw unit, and a plurality of cut slots formed through a wall of the sleeve unit and extending longitudinally from the open terminal end to a location beyond the second concave portion.

2. The combinational bolt as in claim 1 further comprising a screw fasten unit, the screw fasten unit being set inside an opening in the first target object, the screw fasten unit having a plurality of threads formed on an external surface thereof, the screw fasten unit having a hole slot formed therein with a plurality of threads formed therein and matingly corresponding to the threads of the screw unit for coupling the screw unit and the screw fasten unit.

3. The combinational bolt as in claim 1 wherein the sink-proof portion has a projecting stop unit and a plurality of sink-proof circle units near the open terminal end of the sleeve unit, the sink-proof circle units being set adjacent the stop unit; the sink-proof circle units thereby providing an orientation function for the sleeve unit.

* * * * *